Dec. 23, 1969         G. B. FOSTER                3,486,113
STANDARDIZATION OF MEASURING SYSTEMS TO PROVIDE A CONSTANT
OUTPUT SIGNAL RESPONSE CHARACTERISTIC WITH A CHANGEABLE
INPUT TRANSDUCER SIGNAL RESPONSE CHARACTERISTIC
Original Filed Nov. 6, 1961

INVENTOR
George B. Foster
By Anthony D. Cennamo
ATTORNEY

United States Patent Office 3,486,113
Patented Dec. 23, 1969

3,486,113
STANDARDIZATION OF MEASURING SYSTEMS TO PROVIDE A CONSTANT OUTPUT SIGNAL RESPONSE CHARACTERISTIC WITH A CHANGEABLE INPUT TRANSDUCER SIGNAL RESPONSE CHARACTERISTIC
George B. Foster, Worthington, Ohio, assignor to Industrial Nucleonics Corporation, a corporation of Ohio
Continuation of abandoned application Ser. No. 568,694, July 18, 1966, which is a continuation of abandoned application Ser. No. 150,409, Nov. 6, 1961. This application Mar. 7, 1969, Ser. No. 806,048
Int. Cl. G01r 1/02, 35/04, 1/30
U.S. Cl. 324—130
14 Claims

ABSTRACT OF THE DISCLOSURE

Specifically disclosed is a method and apparatus for standardizing a material thickness gauge having a radioactive source, a detector and an amplifier, wherein source standardization is accomplished by removing the source and detector from the material and balancing out the resulting maximum detector signal input to the amplifier with a standardizing input signal which is adjusted so that the amplifier receives a zero net input signal and produces zero output signal. In a subsequent step of standardization, a selected incremental portion of the adjusting standardizing input signal is effectively applied per se to the amplifier input, the resulting amplifier output is compared with a constant reference voltage, and the gain of the amplifier is effectively adjusted so that the amplifier output is equal to the reference voltage. Thus during the measuring operation, when another portion of the standardizing signal is applied to the amplifier input in opposition to the detector output signal, any particular material thickness value always results in the same value of the amplifier output signal being fed to a thickness indicating or recording device.

---

Figure 1:
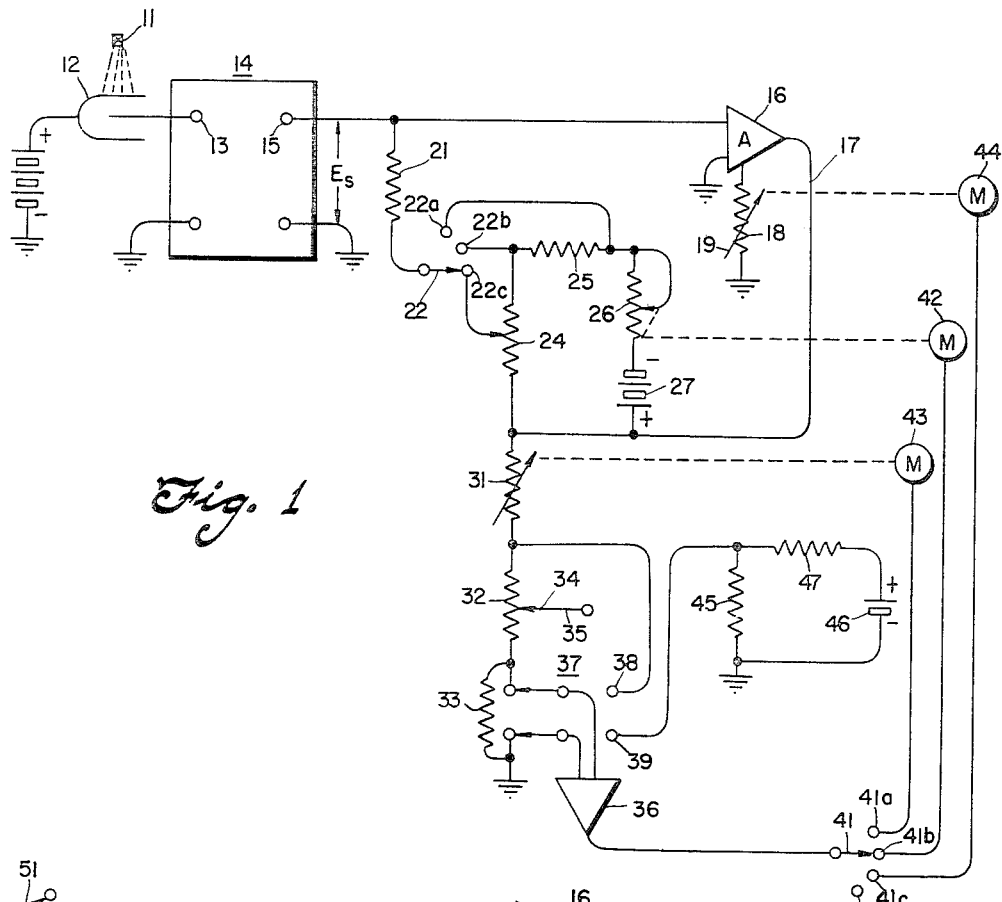

This is a continuation of my copending application Ser. No. 568,694, filed July 18, 1966, now abandoned, which in turn is a continuation of my application Ser. No. 150,409, filed Nov. 6, 1961, now abandoned.

This invention relates generally to measuring systems empoying transducers whose electrical response characteristics are inherently variable with time or changing conditions and more particularly it relates to an improved measuring method and novel circuits which provide completely standardized and calibrated electrical output signals representative of the quantity being measured by the system despite changes in the relationship of the transducer output to the value of said quantity.

The invention will be illustrated and described as being embodied in a radiation absorption-type measuring system, for example, of the kind which is known as a radiation thickness gauge. In such a measuring instrument, the transducer generally comprises the combination of a radioactive source and a radiation detector. By a long and tedious procedure referred to as "calibration," the electrical output of the measuring system including the detector can be correlated with the thickness of a material which is to be measured.

The correlation obtained by such a calibration procedure, however, is only temporary due to factors such as the normal decay of the radioactive source, whose emission of radiation decreases exponentially with time. Whereas at the time of the initial calibration the ratiation detector may pass a certain value of ionization current for a given thickness of material, at a later time the ionization current correspond to this material thickness is reduced because of the decay of the source.

Since the time, labor and expense involved prohibits repetition of the calibration procedure at frequent intervals, methods and circuits have been developed to effect a procedure referred to as "standardization," whereby the correlation between the meaterial thickness and the measuring system output is restored by means of simple circuit adjustments. These circuits and procedures for standardization are described in the patent to Chope, 2,829,268 and the patent to Radley, 2,965,847.

In the system of the Chope patent, which employs a fully satisfactory result is obtained where it is acceptable for the readout indication to be rendered as the position of a mechanical indicator relative to a calibrated scale. However, where it is required that the readout indication be rendered in the form of an electrical current or voltage suitable for operating any conventional electrical indicator, such as a microammeter and the like as described in the patent to Radley, the standardization circuits and procedures so far developed are not completely satisfactory. This is because the electrical output per se of the measuring system can only provide a proportional reproduction of variations in the output of the transducer, that is, the source and detector combination, and the relationship of these electrical variations to variations in the measured material thickness is not constant because of factors such as radioactive source decay, as aforesaid.

A preferred embodiment of the present invention as described in detail herein comprises a circuit similar to that described in the Radley patent. It therefore comprises a form of operational amplifier utilizing negative feedback to maintain the input of the amplifier at substantially zero potential. It incorporates "zero standardization" means for setting up a condition whereby the output of the feedback amplifier is zero when the input signal to the amplifier is zero. It also comprises a transducer, such as a radioactive source and a radiation detector, having a changeable response characteristics for providing an input signal to the measuring system. It further comprises a potentiometer arrangement for providing a variable reference voltage and means for connecting the variable voltage to the input of the amplifier in opposition to the signal voltage.

In order to effect a further phase of standardization which is referred to as "source standardization," the transducer is subjected to a predetermined, known value of the measured variable, which in the case of the radiation gauge constitutes zero thickness of the measured material. At the same time a predetermined point on the opposing voltage source potentiometric network supplies a "standardizing voltage," which is summed with the transducer output voltage to the input of the feedback amplifier. By the "source standardization" adjustment, then the voltage across the entire potentiometer network is adjusted until the selected point on the potentiometer nework provides a standardizing voltage which is exactly equal and opposite to the transducer output voltage, whereupon the output of the feedback amplifier is again reduced to zero.

The foregoing standardization arrangement and the operation of the measuring system which employs the standardization arrangement is fully described in the Radley patent and no detailed repetition is necessary herein. It is sufficient to state that as the thickness of the measured material varies with respect to a predetermined value, the feedback amplifier provides a corresponding voltage output variation. However, it is apparent that as the radioactive source decays the transducer output voltage or detector output voltage exhibits a smaller and smaller excursion for a given change in the thickness of the material which is measured. Correspondingly the amplifier output signal which is delivered to external readout apparatus such as the microammeter, likewise exhibits a smaller and smaller voltage excursion for a given change in thickness of the material. Thus the deflection sensitivity of the readout apparatus is correspondingly reduced and becomes erroneous.

In accordance with this invention, I provide means in the opposing voltage potentiometric network for adding an increment of voltage to the output of the network which obtains during the source standardization phase. It is important to note that this is not a fixed increment of voltage or current such as is conventionally applied in the calibration of conventional microammeters, voltmeters, or measuring systems employing similar arrangements. On the other hand, this voltage increment is directly proportional to the source standardization reference potential or standardizing voltage and hence is variable with any change effecting the output characteristic of the transducer or the output of the opposing voltage network.

In a manner similar to that described in the Radley patent, a preferred embodiment of the present invention employs means for delivering to an external readout device a voltage proportional to the output of the feedback amplifier and means for adjusting the proportionality between the amplifier output and the delivered readout voltage. The invention, however, further provides means for obtaining a check voltage proportional to the voltage which is delivered to the readout circuit a source of an absolute constant reference voltage, and means for comparing the check voltage with the constant reference voltage. This comparison is made while the proportional signal increment is applied to the input of the feedback amplifier and if any difference exists between the check voltage and the constant reference voltage, a readjustment is made of the proportionality between the amplifier output voltage and the voltage which is delivered to the readout device. By means of this novel arrangement, the readout voltage always bears a constant, predetermined relationship to the value of the measured variable, despite changes in the relationship between the transducer output and the value of the measured variable.

It is, accordingly, a primary object of the present invention to provide an improved measuring circuit and method of standardization therefor, whereby the circuit is adapted to render an output indication in the form of an electrical signal which is standardized for both the operating point calibration and span or deflection sensitivity.

Another object is to provide an arrangement for automatic standardization and calibration of measurement circuits with respect to all quantities affecting the absolute indication and sensitivity of response of the equipment.

Figure 2:
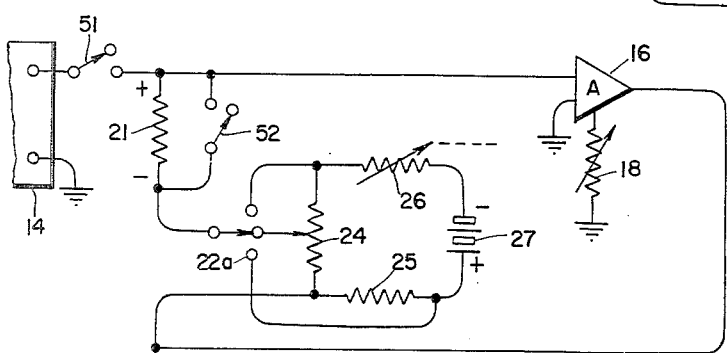

These and other objects of the invention will be apparent from the following detailed description taken in conjunction with the accompanying drawings wherein:

FIG. 1 is a schematic circuit diagram of a measuring system incorporating a preferred embodiment of the invention; and FIG. 2 is a modified circuit for the elimination of transducer noise.

Referring now to FIG. 1, a representation of a radiation absorption measuring system is shown which includes a radiation source 11 directing penetrative radiation to an ionization detector 12 to produce at terminal 13 a response in accordance with the amount of radiation falling on the detector 12. The terminal 13 corresponds to the input of an impedance transforming device 14 where the signals may be transformed to an impedance level lower than that of the ionization detector 12 and, if desired, integrated to produce a D.C. signal at terminal 15. The latter signal constitutes the input signal to the measuring system per se of the present invention.

The signal at terminal 15 is applied to the input of an amplifier 16 which may be of any suitable design, such as that disclosed in the above-referenced patent to Chope to provide at output 17 a replica of the input signal but with opposite phase or polarity. In order to provide the proper operating voltage level for the output 17, a bias adjustment for the amplifier 16 is indicated as provided by a variable resistor 18 connected to ground and being adjustable by means of a mechanically movable element 19. Other arrangements for zeroing amplifiers of this type by bias adjustment are well known in the art and will not be desecribed herein in detail.

The signal terminal 15, which applies input signal to the amplifier 16, is connected through a large value resistor 21 to a movable contact 22 of a three-position switch which is selectively operable to connect the movable contact 22 to fixed contacts 22a, 22b and 22c. The contact 22c is connected to the variable tap of a potentiometer 24 which is connected through a resistor 25 and an adjustable resistor 26 to a D.C. voltage source 27. The remaining terminals of the potentiometer 24 and the voltage source 27 are connected to the feedback line 17.

The voltage at the tap of potentiometer 24 is thus determined by the position of the tap and the adjusted value of the resistor 26 and appears as a potential with reference to the voltage level appearing on line 17. This voltage at the tap of potentiometer 24 is the calibration reference signal, which is in opposition to the transducer input signal delivered to terminal 15. Since the normal inverse feedback operation of amplifier 16 is to maintain its input terminal 15 at essentially ground potential, the amplifier output terminal or line 17 is automatically maintained at a potential with respect to ground which is essentially equal to the difference between the transducer input voltage and the calibration reference voltage.

The amplifier output signal is utilized by a circuit adapted to provide an absolutely calibrated voltage signal to a readout device. This circuit is referred to as a "measurement signal circuit" for convenience herein, and the exemplary arrangement of the circuit illustrated is supplied with a portion of the amplifier output voltage through an adjustable voltage dropping resistor 31. To this end, the amplifier output line 17 is connected to its ground reference point through the adjustable resistor 31 and the measurement signal circuit comprising sensitivity potentiometer 32 and a small error signal resistor 33. This series resistor circuit is connected across the output of the amplifier 16 so that when a voltage is developed at the amplifier output a predetermined portion thereof appears across the potentiometer 32. The adjustable portion appearing across potentiometer 32 is determined (neglecting the small resistance of the error resistor 33) by the value of the adjustable resistor 31, with the resistors 31 and 32 providing a voltage divider or attenuator type of coupling for the output circuit.

The actual output signal is taken on line 35 from a movable contact 34 on the potentiometer 32. The line 35 connected to the contact 34 connects the output signal from the measuring system of the invention to any desired device or devices such as indicators, recorders or control systems. Said signal has an adjustable relative sensitivity determined by the setting of the tap 34.

A servomechanism is provided for making automatically the adjustments required to standardize the circuit of the present invention. For this purpose a servo amplifier 36 has input D.C. signals applied thereto from a switch 37 which may be selectively connected across the error resistor 33 or across terminals 38 and 39. When the switch is connected to the error resistor 33, the voltage applied to the servo amplifier 36 will have polarity depending upon whether the line 17 is above or below ground potential and hence can be employed after suitable amplification to drive D.C. motors in a direction determined by said polarity.

The output of the servo amplifier 36 is applied to a movable contact 41 of a switch which includes fixed contacts 41a, 41b and 41c. The contact 41b is connected to operate a motor 42 for adjusting the resistor 26. The contact 41a is connected for operating a motor 43 for adjusting the resistor 31. The contact 41c is connected for operating a motor 44 which adjusts the resistor 18.

The terminals 38 and 39 supply an input voltage to the amplifier 36, when the switch 37 is connected thereto, which corresponds to the potential difference between the voltage at the junction of resistors 31 and 32 and a standard reference voltage. This standard reference voltage appears across resistor 45 and is derived from any suitable source represented by the battery 46. A suitable voltage regulator circuit may be used. The reference voltage is divided by the dropping resistor 47 to provide a suitable calibration value, such as 100 millivolts, across the resistor 45.

The procedure and concomitant operation of the circuit of FIG. 1 for a standardization of all quantities is as follows. A short circuiting connection is applied between the terminal 15 and the amplifier output connection 17, whereby the input voltage to the amplifier 16 is reduced to zero. Due to the high impedance of the network 21–26, the position of switch 22 is immaterial while the short circuiting connection is applied. The switch 37 is connected to the resistor 33 and the movable contact 41 is connected to fixed contact 41c. These connections provide for zeroing the amplifier 16 during which the motor 44 will be driven in a direction determined by the polarity of the signal across resistor 33 to reduce that voltage to zero by the adjustment of the bias level of the amplifier 16 until the output of the amplifier on line 17 is zero. This zeroing of the amplifier produces zero output for the condition of zero input. The short circuit at the input of amplifier is removed after the amplifier 16 is zeroed.

The next operation for standardizing the system corresponds with source-standardization as practiced in the above-referenced patent to Chope in which all material between the source 11 and ionization detector 12 is removed and the system is zeroed in the presence of the maximum radiation signal which will be detected. To accomplish this source-standardization, the switch 22 is placed in contact with 22b. This circuit point provides the "standardizing voltage," appearing across the total resistance of potentiometer 24, while the maximum radiation signal is present at terminal 15 and hence at the input of amplifier 16. The switch 37 is connected across the resistor 33 and contact 41 is connected to fixed contact 41b to drive the motor 42 and adjust resistor 26.

This servo control system is arranged to vary the resistance 26 to vary the voltage across the potentiometer 24 until it is equal and opposite to that across resistor 21 resulting from the ionization detection signals at terminal 15. When resistor 26 has been adjusted to this point, the net input voltage to the amplifier 16 is zero and the error voltage across resistor 33 is zero. For this condition the voltage across the potentiometer 24 equals and has opposite polarity to the radiation detector voltage across the resistor 21. The operating point for the measurement to be made can, therefore, be selected by the position of the variable tap of potentiometer 24 when the movable switch 22 is connected to the fixed contact 22c. The position of the variable tap of potentiometer 24 can be calibrated in terms of the product thickness or other radiation absorbing characteristic and variations in the product characteristic will be measured about this point. In this manner the operating point of the system can be set to correspond to any desired radiation level existing for the absorption characteristic of the product specification.

The absolute sensitivity phase of standardization for the measurement circuit of FIG. 1 is accomplished by switching switch 22 to contact 22a, connecting switch 37 to contacts 38 and 39 and connecting the output of the servo amplifier 36 to operate the motor 43 by connecting switch 41 to contact 41a. This operation is performed with no absorber in the gap between the radiation source 11 and the detector 12 and thus the maximum detected radiation signal appears at terminal 15. The connection of switch 22 to contact 22a introduces resistor 25 into the circuit in which the opposition voltage to the radiation signal is developed. If resistor 25 has a value which is a known fraction of the value of resistor 24 and is relatively small in comparison therewith such as, for example, one percent of resistor 24, the increment in voltage introduced by changing switch 22 from contact 22b to contact 22a will correspond to one percent of the span or total deflection of the instrument available over the range of potentiometer 24.

The input to amplifier 16 is the sum of three voltages, the voltage appearing across the high value resistor 21 as a result of the radiation detector output signal applied thereto, the standardizing voltage across potentiometer 24, and the voltage across resistor 25. Since in the foregoing source-standardization procedure the voltage across potentiometer 24 was adjusted to be exactly equal and opposite to the standardizing input voltage across resistor 21, the sum of the three voltages is simply the incremental voltage across resistor 25. Because the voltage increment in the example given is one percent of the voltage across potentiometer 24, because the voltage across potentiometer 24 is equal to the voltage across the high value resistor 21, and because the voltage across resistor 21 is directly proportional to the output of radiation detector 12 when the measured material is absent, the voltage increment generated across resistor 25 directly proportional to the standardizing input signal produced by the detector under the source standardizing conditions. This increment in the voltage will produce an output on line 17 and a fractional portion of this voltage will appear across the potentiometer 32 and hence at terminal 38.

For convenience, the voltage at terminal 38 may be termed a check signal, or check voltage. The servo amplifier 36 will have an input signal and drive motor 43 to adjust resistor 31 until the voltage at terminal 38 equals the voltage at terminal 39 and hence the voltage difference therebetween is zero. Since the voltage on terminal 39 is a calibrated standard value with reference to ground potential the one percent span deflection sensitivity introduced by resistor 25 will correspond to an output signal across potentiometer 32 equal to the standard reference voltage across resistor 45. If this voltage across resistor 45 is, say, 100 millivolts and resistor 25 is one percent of resistor 24 then the system is calibrated with a standardized deflection sensitivity of 100 millivolts/percent center scale deflection. The full range of response of the instrument would accordingly be ten volts. This calibrated output is available from the potentiometer 32 by means of the adjustable tap 34 which may be calibrated in terms of sensitivities bearing any desired fractional or decimal relation to the calibrated maximum sensitivity output obtained when the full voltage across potentiometer 32 is applied at output lead 35.

Following the foregoing standardization procedure, the switch 22 is returned to contact 22c, switch 41 is moved to a vacant contact 41d and the appropriate operating point and calibrated sensitivity factor are selected, respectively, by adjusting the variable taps of potentiometer 24 and 32. The setting of potentiometer 24 selects a particular "center thickness" value for the product passing between the source 11 and detector 12. This center value is thereafter represented by zero output on line 35. Any output voltage appearing on line 35 then represents in magnitude and polarity the difference between the center value and the actual thickness or absorption characteristic of the product passing between the source 11 and the detector 12. The absolute value of the voltage appearing at line 35 can be taken as a measure of the deviation of the product from the center value and read in terms of known thickness changes or used in calibrated controllers where a given voltage magnitude corresponds to a given thickness change. The functioning of the measuring system during this normal operation is substantially identical with that of the measuring system of the Radley Patent No. 2,965,847, except that the output voltage has been standardized so as to bear an absolute and constant proportional relationship to the material thickness deviation, whereas in the measuring system of the Radley patent the proportional relationship is arbitrary and the proportionality factor changes each time the measuring system is source standardized.

Referring now to FIG. 2, a modification of the circuit of the invention is shown which permits the introduction of a sensitivity standardization signal without transducer noise being present in the input of the amplifier 16. Only a portion of the circuit of FIG. 1 is reproduced, the changes involved being the addition of switch 51 between the terminal 15 and the resistor 21, the shorting switch 52 across resistor 21 and the transposition of the position of resistor 25 to be connected from the positive terminal of the battery 27 to the output line 17. The remainder of the circuit is substantially identical with that of FIG. 1 and hence is not shown. With the arrangement of FIG. 2 it is apparent that when a connection is made to switch contact 22a and either switch 51 is opened or switch 52 is closed the sole input voltage to the amplifier 16 is the voltage across the standardizing resistor 25 which is merely the D.C. voltage increment which is generated as previously described in conection with FIG. 1. The standardization procedure described in connection with the adjustment of resistor 31 may therefore be carried out with solely a D.C. input signal to the amplifier 16 since both the detector voltage across resistor 21 and the standardizing voltage across the potentiometer 24 have been removed.

The alternate switches 51 and 52 are provided to isolate the measurement circuit from the transducer connected to terminal 15 and one or the other will be used depending upon the source impedance of the transducer. If the source impedance is high, switch 52 can be used to short circuit resistor 21 and the output of the transducer. On the other hand, if a low impedance source is connected to the terminal 15 the switch 51 can be opened to isolate the circuit from the signal from the transducer without unduly loading the transducer.

Various modifications of the invention herein disclosed will now be apparent to those skilled in the art to provide a completely calibrated and standardized measurement system capable of maintaining a constant sensitivity irrespective of the source strength of the radiation source 11 or other source-type drifts which are compensated for in the standardization procedure. The output can furthermore be used directly since it is calibrated in terms of an absolute sensitivity for the total range of the instrument and hence can be used to represent actual deviation with respect to the specification value of the product being manufactured.

I claim:

1. A measurement system comprising a transducer for developing a transducer voltage signal which varies in accordance with the characteristics to be measured, a phase reversing amplifier having an input and an output, an adjustable standardizing voltage source, a circuit for combining said transducer voltage and said standardizing voltage in opposition and applying the combined voltage reference to said output as the signal to said input, a measurement signal circuit, means for coupling an adjustable portion of the voltage at said output to said measurement signal circuit, means for selectively introducing a fixed percentage increment to the adjustable standardizing voltage applied to said input, and means for comparing said adjustable portion with a standard reference voltage to standardize the sensitivity of response of said systems to said increment.

2. The system according to claim 1 in which said amplifier is a D.C. amplifier and includes means for adjusting the voltage at said output to be zero when the voltage at said input is zero.

3. The system according to claim 1 and including a serve controller to be responsive to voltage in said measurement signal circuit, means for selectively coupling said servo controller to adjust the voltage at said output and said standardizing voltage source, an alternate connection for the input of said servo controller making it responsive to the difference between said adjustable portion and said standard reference voltage, and means for selectively coupling said servo controller to adjust said adjustable portion to equal said standard reference voltage.

4. A measuring circuit comprising terminals across which a voltage signal representing the quantity to be measured can be applied, a phase reversing amplifier having an input and output, an adjustable standardizing voltage source, a circuit for combining said standardizing voltage in opposition to the voltage signal applied to said terminals to produce a combined voltage, means for applying said combined voltage as a potential with reference to said output as the signal to said input, a measurement signal circuit, means for coupling an adjustable portion of the voltage at said output to said measurement signal circuit, means for selectively introducing a fixed percentage increment to said adjustable standardizing voltage and means for comparing said adjustable portion with a standard reference voltage to standardize the sensitivity of response of said measuring circuit to said increment.

5. A circuit according to claim 4 and including a servo controller, means for connecting said servo controller to be responsive to voltage in said measurement signal circuit, means for selectively coupling said servo controller to adjust the voltage at said output and said standardizing voltage source, an alternate connection for the input of said servo controller making it responsive to the difference between said adjustable portion and said standard reference voltage, and means for selectively coupling said servo controller to adjust said adjustable portion to equal said standard reference voltage.

6. A measurement circuit comprising a phase reversing D.C. amplifier having input and output terminals, means for adjusting said amplifier to make the voltage said output terminal zero for zero volts at said input terminals; a first adjustable resistor and a first potentiometer connected in a circuit between said output terminals and ground; a three way selector switch; a high value resistor connected between said input terminal and the movable contact of said selector switch; a second potentiometer connected between one of the selectable contacts of said selector switch and said output terminal; a voltage source, a second adjustable resistor and a fixed calibrating resistor serially connected across said second potentiometer, a connection from the terminal of the calibrating resistor remote from said second potentiometer to a second selectable contact of said switch; a connection from the movable tap on said second potentiometer to the remaining selectable contact on said switch; a standard reference voltage source; means for comparing the voltage across said first potentiometer with said reference voltage; and an output circuit connected to the tap on said first potontiometer.

7. Apparatus according to claim 6 and including means responsive to voltage across said output terminals for selectively adjusting said amplifier to have zero output voltage for zero input voltage and adjusting said second adjustable resistor to produce zero output voltage from said amplifier with a standard input signal at said input terminals; and means for adjusting said first adjustable resistor to make the voltage across said first potentiometer equal said reference voltage when said selector switch movable contact is connected to said second selectable contact.

8. Apparatus according to claim 6 and including switch means for removing signal voltage and the voltage across said second potentiometer from said input terminals and substituting only the voltage across said fixed calibrating resistor as the input to said amplifier.

9. In a measuring system having a transducer for providing an input signal variably proportional to a characteristic to be measured, means for generating a reference signal having an adjustable proportionality to values of said input signal, signal responsive means for providing an output signal constantly proportional to a signal delivered thereto, and normally responsive to the difference between said input and reference signal, means for adjusting said proportionality of said reference signal generating means to provide a predetermined value of said output signal when said transducer is exposed to a predetermined value of said characteristic, and means providing a readout signal variably proportional to said output signal, the improvement comprising:

means for delivering an incremental portion of said reference signal as a signal indicative of said proportionality thereof to said signal responsive means, means for providing a check signal proportional to said readout signal when said incremental portion is delivered, a source of a constant signal, and means for adjusting said proportionality between said output signal and said readout signal so as to equalize said constant signal and said check signal.

10. In a system for determining a characteristic of a measured material using a radiation source and a detector, said system being adapted for a normal measuring operation with said material present, wherein said detector produces a measuring input signal for said system which varies with said characteristic, said system also being adapted for a standardizing operation with said material absent, wherein said detector produces a standardizing input signal for said system, said system including an amplifier having an output circuit, and an input circuit responsive during said measuring operation to variations in said measuring input signal to produce an amplifier output signal voltage in said output circuit which is quantitatively indicative of variations in the value of said material characteristic, the improvement of means for standardizing the response of said system, comprising:

a source of a standard reference voltage, means for generating a voltage proportional to said standardizing input signal produced by said detector when said material is absent, means for coupling said generated proportional voltage to said amplifier input circuit during said standardizing operation, means for comparing said standard reference voltage with at least a portion of said amplifier output voltage, and means for adjusting the amplitude of said amplifier output voltage while said generated proportional voltage is coupled to said amplifier input circuit to make said output voltage portion compared with said standard voltage substantially equal thereto.

11. Apparatus as in claim 10 wherein said means for generating a voltage proportional to said standardizing input signal comprises a high value resistor connected to said amplifier input circuit and coupled to said detector so as to produce across said resistor a first voltage proportional to said standardizing input signal when said material is absent, adjustable means for producing a second voltage which is adjusted to be equal to said first voltage, said adjustable means also including means for producing a third voltage whose value is simultaneously adjusted with the adjustment of said second vlotage so that the value of said third voltage is equal to a predetermined fractional increment of said second voltage, said third voltage constituting said voltage proportional to said standardizing input signal.

12. Apparatus as in claim 11, wherein said means for coupling said generated proportional voltage to said amplifier input circuit comprises means for combining said first voltage, said second voltage and said third voltage so that said first and second voltages are combined with opposite polarity to cancle each other, whereby only said third voltage is effective to produce a signal at said amplifier input.

13. Apparatus as in claim 11 wherein said means for coupling said generated proportional voltage to said amplifier input circuit comprises means for removing said first voltage and means for disconnecting said second voltage whereby only said third voltage is effective to produce a signal at said amplifier input.

14. A method of standardizing a gauge system for measuring a characteristic of a material, said gauge system having a source and detector, an amplifier having an input and an output circuit, said gauge system being arranged for a normal measuring operation with said material present wherein said detector provides a measuring signal input to said amplifier and said output circuit produces a signal that is responsive to said measured characteristic, said gauge system also being arranged for a standardizing operation with said material absent, wherein said detector produces a standardizing signal, said amplifier functioning during both said normal measuring operation and said standardizing operation in a condition such that said amplifier output circuit produces a predetermined output signal for zero measuring signal or zero standardizing signal input applied to said input circuit, said method comprising the steps of producing a signal proportional to said standardizing signal, the magnitude of said proportional signal being determined by the magnitude of said standardizing input signal produced by said detector, applying said proportional signal to said amplifier input, producing a reference signal of a reference magnitude, comparing, while said proportional signal is applied, at least a portion of the resulting amplifier output signal with said reference signal, and adjusting said amplifier output to make said resulting amplifier output signal portion and said reference signal substantially equal.

References Cited

UNITED STATES PATENTS

| 2,884,530 | 4/1959 | Foster. | |
| 3,237,097 | 2/1966 | De Santis | 324—74 X |

ALFRED E. SMITH, Primary Examiner

U.S. Cl. X.R.

250—83; 324—74, 123

UNITED STATES PATENT OFFICE
CERTIFICATE OF CORRECTION

Patent No. 3,486,113            Dated December 23, 1969

Inventor(s) George B. Foster

It is certified that error appears in the above-identified patent and that said Letters Patent are hereby corrected as shown below:

Column 2, line 10, after "a", insert -- servo-rebalancing potentiometer bridge arrangement, a --; line 55, "nework" should read -- network --.

Column 4, line 8, "desecribed" should read -- described --.

Column 6, line 32, "potrion: should read -- portion --.

Claim 3, Column 8, line 2, "serve" should read -- servo --; after "controller" insert --, means for connecting said servo controller --.

Claim 4, Column 8, line 16, "appllied" should read -- applied --.

Claim 11, Column 10, line 7, "vlotage" should read -- voltage --.

Claim 12, Column 10, line 18, "cancle" should read -- cancel --.

Signed and sealed this 15th day of February 1972.

(SEAL)
Attest:

EDWARD M. FLETCHER, JR.        ROBERT GOTTSCHALK
Attesting Officer                 Commissioner of Patents